US 7,044,336 B2

(12) United States Patent
Bertone

(10) Patent No.: US 7,044,336 B2
(45) Date of Patent: *May 16, 2006

(54) MULTI-FLAVORED HOT BEVERAGE DISPENSER

(75) Inventor: Claudio Bertone, St-Leonard (CA)

(73) Assignee: Bertone Holdings Inc., St. Laurent (CA)

(*) Notice: Subject to any disclaimer, the term of this patent is extended or adjusted under 35 U.S.C. 154(b) by 0 days.

This patent is subject to a terminal disclaimer.

(21) Appl. No.: 11/047,639

(22) Filed: Feb. 2, 2005

(65) Prior Publication Data

US 2005/0127098 A1    Jun. 16, 2005

Related U.S. Application Data

(63) Continuation of application No. 10/671,615, filed on Sep. 29, 2003, now Pat. No. 6,874,660, which is a continuation of application No. 10/164,571, filed on Jun. 10, 2002, now abandoned, which is a continuation of application No. 09/629,449, filed on Jul. 31, 2000, now Pat. No. 6,419,120.

(30) Foreign Application Priority Data

Jul. 12, 2000    (CA) .................................. 2313794

(51) Int. Cl.
B67D 5/56    (2006.01)
(52) U.S. Cl. ................. 222/129.4; 222/1; 222/132; 222/135; 222/145.6; 222/146.5
(58) Field of Classification Search .. 222/129.1–129.4, 222/144.5, 145.1, 132, 135, 145.5, 145.6, 222/146.1, 146.2, 146.5, 146.6, 1
See application file for complete search history.

(56) References Cited

U.S. PATENT DOCUMENTS

| 4,595,131 | A | * | 6/1986 | Ruskin et al. .............. 222/640 |
| 5,265,518 | A | * | 11/1993 | Reese et al. ................... 99/280 |
| 5,344,050 | A | * | 9/1994 | Ficken .................... 222/129.4 |
| 6,202,894 | B1 | * | 3/2001 | Struminski et al. ...... 222/129.3 |

* cited by examiner

Primary Examiner—J. Casimer Jacyna

(57) ABSTRACT

An apparatus for dispensing a flavored beverage. The apparatus comprises a hopper adapted to hold a common base powder and having a hopper outlet, the hopper being operative to dispense the base powder via the hopper outlet in accordance with a powder dispense signal, and a water dispenser having a water outlet, the water dispenser being operative to dispense water via the water outlet in accordance with a water dispense signal. The apparatus further comprises a flavor dispensing unit adapted to store a plurality of supplies of flavoring syrups, the flavor dispensing unit being operative to dispense via at least one flavor dispensing outlet at least one of the flavoring syrups in accordance with a respective one of a plurality of flavor dispense signals. A mixing unit is adapted to receive and admix base powder from the hopper outlet, water from the water outlet, and the at least one of the flavoring syrups from the at least one flavor dispensing outlet to produce the flavored beverage. Also, the apparatus comprises a control unit operative to produce the powder dispense signal, the water dispense signal, and the plurality of flavor dispense signals in response to user actuation indicative of a selected beverage flavor and a desired beverage volume. The control unit is operative to generate the water dispense signal in accordance with the desired beverage volume, to generate the powder dispense signal in accordance with at least the desired beverage volume, and to generate the at least one flavor dispense signal in accordance with both the desired beverage volume and the selected beverage flavor.

18 Claims, 9 Drawing Sheets

MULTI-FLAVORED HOT BEVERAGE DISPENSER

CROSS-REFERENCES TO RELATED APPLICATIONS

This application is a continuation of application Ser. No. 10/671,615 to Bertone, filed on Sep. 29, 2003 now U.S. Pat. No. 6,874,660, which is a continuation of application Ser. No. 10/164,571 to Bertone, filed on Jun. 10, 2002 now abandoned, which is a continuation-in-part of application Ser. No. 09/629,449 to Bertone, filed on Jul. 31, 2000, now issued as U.S. Pat. No. 6,419,120.

FIELD OF THE INVENTION

This invention relates generally to an apparatus for dispensing beverages constituted from hot water, powder and flavouring syrups. More particularly, the invention relates to automated dispensing apparatus to produce a hot beverage, such as hot chocolate, hot cappuccino, hot powdered teas and the like, from a heated water supply, a base powder and a flavouring syrup selected from one or more of a plurality of syrups.

DESCRIPTION OF THE RELATED ART

Heretofore, hot beverages such as hot cappuccino and hot chocolate have been typically dispensed from automated dispensing apparatus having a product container, a boiler to heat water, a solenoid dispense valve, and a mixing system. Where the drink is a hot drink product, the flavouring product is typically a powder. Consequently, the powdered drink constituent, for example cappuccino, is maintained within a product hopper container. Where a variety of flavours are dispensed from the apparatus, a corresponding product hopper container is utilized for each flavour variety. When the product is to be dispensed, an activation button is depressed and the selected powder is dispensed from its hopper container into the mixing system. At the same time, a hot water solenoid valve opens to allow the entry of hot water into the mixing system. The powdered flavour, for example cappuccino, is mixed with the water and dispensed through the mixing system. As each of the available flavouring powders is maintained in a separate hopper, there are consequently several hoppers required to provide for the choice of drinks available from the dispenser. Thus, with the aforementioned dispensing systems available in the market today, the flavouring powders, for example, the cappuccino powders are pre-flavoured with a variety of flavourings. For example, providing a French vanilla cappuccino flavour requires French vanilla cappuccino powder and an associated product hopper container; an amaretto cappuccino flavour would be dispensed from the amaretto cappuccino powder product hopper container; and an Irish cream cappuccino flavour would be dispensed from the Irish cream cappuccino powder product container and so forth. An example of the type of multi-flavour beverage dispensers available is disclosed in U.S. Pat. No. 5,927,553 to Ford which provides a powdered beverage mixing and dispensing apparatus having three powdered flavour product hoppers each with associated mixing and dispensing apparatus.

Where the operator desires to offer a variety of flavours, generally three flavours are made available. Providing a multi-flavour dispenser capable of dispensing three flavours is considered the maximum number of flavours that can conveniently be dispensed from a multi-flavour dispenser. For multi-flavour dispensers, a three-flavour dispenser has become a standard multi-flavour dispense product offering in the industry. The reason that the industry standard has been limited to three flavours, is that to add an additional new flavoured cappuccino to the machine, the dispenser will become bigger and wider. For example, the average hot drink or cappuccino dispensers available are approximately 14" wide. For a single flavour dispenser, a large product hopper container is provided which provides the greatest possible number of drinks dispensable without requiring refilling servicing. When a multi-flavour product dispenser is provided, multiple product hopper containers are provided with a consequent decrease in the storage volume available to any one product. Thus, when the variety of product flavours available increases to three, the product hopper size for each individual product flavour is decreased. Consequently, the dispenser apparatus must be refilled more frequently to refill each of the smaller product hopper containers as they become emptied, unless, of course, the identical number of drinks of each flavour is dispensed.

To provide additional flavours beyond three requires the operator to purchase an additional unit to hold additional product hopper containers and associated equipment including an additional dispense valve, additional mixing system—in essence, a second dispenser apparatus. However, in the food service industry, counter space is a valuable commodity. Therefore, the operators are not inclined to add any additional flavours to support extra drink flavouring choice beyond three because the equipment to provide extra choices beyond three would take up too much additional counter space. Put another way, the incremental increase in returns from providing an extra flavour is not justified by the added revenues obtained from the use of additional counter space. As a result, the operator has turned away some customers who may appreciate alternate flavours because it wouldn't be worth the extra expense of taking up additional counter space.

SUMMARY OF THE INVENTION

In accordance with a broad aspect, the invention provides an apparatus for dispensing a flavored beverage. The apparatus comprises a hopper adapted to hold a common base powder and having a hopper outlet, the hopper being operative to dispense the base powder via the hopper outlet in accordance with a powder dispense signal, and a water dispenser having a water outlet, the water dispenser being operative to dispense water via the water outlet in accordance with a water dispense signal. The apparatus further comprises a flavor dispensing unit adapted to store a plurality of supplies of flavoring syrups, the flavor dispensing unit being operative to dispense via at least one flavor dispensing outlet at least one of the flavoring syrups in accordance with a respective one of a plurality of flavor dispense signals. A mixing unit is adapted to receive and admix base powder from the hopper outlet, water from the water outlet, and the at least one of the flavoring syrups from the at least one flavor dispensing outlet to produce the flavored beverage. Also, the apparatus comprises a control unit operative to produce the powder dispense signal, the water dispense signal, and the plurality of flavor dispense signals in response to user actuation indicative of a selected beverage flavor and a desired beverage volume. The control unit is operative to generate the water dispense signal in accordance with the desired beverage volume, to generate the powder dispense signal in accordance with at least the desired beverage volume, and to generate the at least one flavor dispense signal in accordance with both the desired beverage volume and the selected beverage flavor.

In accordance with another broad aspect, the invention provides a method of producing a flavored beverage. The method comprises the step of receiving user actuation indicative of a selected beverage flavor and a desired beverage volume. The method further comprises using a dispenser apparatus to produce the flavored beverage by performing the steps of: i) supplying water in an amount dependent on the desired beverage volume; ii) supplying a base powder in an amount dependent on at least the desired beverage volume; iii) supplying at least one flavoring syrup from at least one of a plurality of flavoring syrup supplies in an amount dependent on the desired beverage volume and in a distribution corresponding to the selected beverage flavor; and iv) admixing the base powder, the water, and the at least one flavoring syrup to produce the flavored beverage.

A detailed description of embodiments of the invention will now be provided with reference to the attached drawings in which like reference numerals have been used for like features of the embodiments throughout the various figures of the drawings.

DETAILED DESCRIPTION OF EMBODIMENTS

Figure 1:
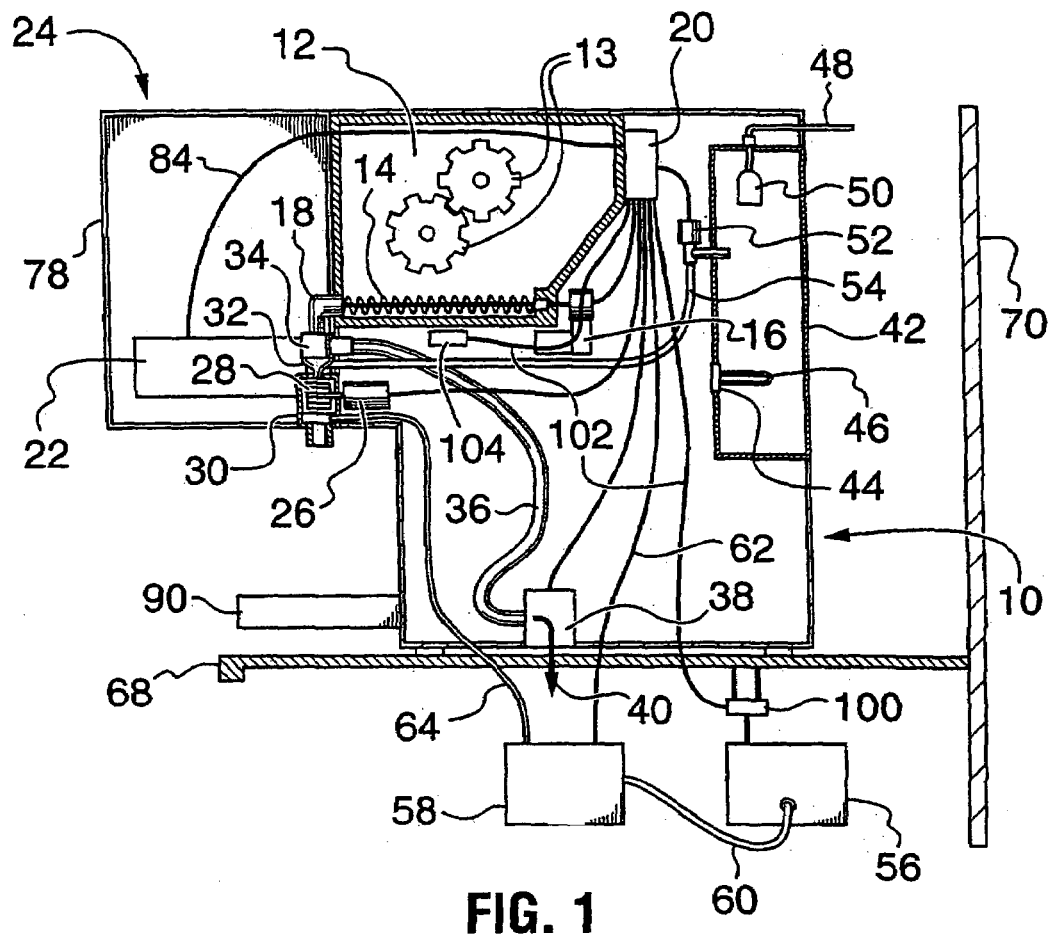
FIG. 1 is a partial cross-sectioned side view of a multi-flavoured hot drink dispenser in accordance with a specific example of implementation of the present invention.

FIG. 1 shows a partial cross-sectioned side view of a multi-flavoured hot drink dispenser constructed in accordance with the principles of the present invention. The dispenser is generally depicted by reference numeral 10 and uses a base powder dispensing system comprising a hopper 12 to hold a base powder. Typically, the base powder will be an unflavoured base powder and the flavour of the hot drink that will be produced will be provided by a flavouring syrup. It will be understood, however, that the base powder may also be a hot chocolate drink powder that is further flavoured by a selected flavouring syrup. The hopper 12 has been cross-sectioned in this view to show internal components. Hopper 12 contains an auger drive 14 which is activated by auger motor 16 to dispense powder out of the powder dispensing nozzle or hopper dispenser outlet 18. Auger motor 16 is controlled and powered by main control board 20. Main control board 20 is electrically coupled to a keypad 80, the backside of which is visible at 22 on the inside of the door 24 of the dispenser. Contained within hopper 12 are agitators 13 that rotate when auger 14 is activated such as to cause the powder contained within the hopper 12 to become loose and free and available for pickup by auger 14.

The length of time during which auger 14 will be driven by the auger motor 16 depends on the type and size of drink selected by the user via the keypad 80. The auger 14 controls the amount of base powder that will be dispensed and will depend on the size of drink selected and the type of beverage product flavouring. The amount of base powder dispensed may be pre-set to yield the optimal consistency and taste of the hot drink product dispensed. The amount of base powder dispensed by auger 14 can be varied for each and every one of the drink selections the user makes.

Both the base powder and water enter a mixing system where they are mixed and blended together. The mixing system may include a vacuum funnel 34 which is attached to a blower system 38. The blower system 38 is employed to extract any powder particles that may be dispersed into the air as the powder is dispensed from the hopper dispenser outlet 18 into the mixing system. In a specific embodiment of the invention, the vacuum funnel 34 is connected to a vacuum discharge line 36. Vacuum discharge line 36 may be a flexible tubing which extends between vacuum funnel 34 and blower 38. When activated, blower 38 draws air from vacuum funnel 34 and expels that air via tube 36 and blower 38 outward from the mixing apparatus through a discharge outlet and generally in the direction of arrow 40. Thus the vacuum system is activated to extract any powder particles that may be dispersed into the air as the powder is dispensed from the hopper dispenser outlet 18 and expel such powder particles from the dispenser 10 through the discharge outlet.

The dispenser 10 also includes a hot water dispensing system which is provided to reconstitute the base powder drink constituent. The hot water system comprises a boiler 42 to hold and provide a means for heating the water. The boiler 42 has been shown in sectioned view in FIG. 1 to better illustrate its construction. A heater control 44 senses the temperature of the water and controls the energization of the heating elements 46 which are submersed in the water. A fresh water supply 48 is connected to a source of pressurized domestic water. Water flow into boiler 42 is controlled by means of a level sensing valve 50 that maintains the water level within boiler 42. The boiler 42 includes a dispense valve 52 which is controlled by control board 20 and includes a solenoid means to activate dispense valve 52 to open and close the water supply between boiler 42 and the hot water dispense line 54. Hot water dispense line 54 is connected to mixing funnel 32 whereby when dispense valve 52 is opened, hot water is dispensed into mixing funnel 32 where it will flow into whipping chamber 30 to be mixed with the base powder dispensed thereinto from hopper dispenser outlet 18. The duration and, therefore, the amount of water dispensed by dispensing valve 52 is controlled by main control board 20 and will vary depending on the size of the beverage which the user has selected by depressing a selection key on the keypad 80 on the exterior of the front door 24.

When the base powder is dispensed from hopper 12, whipper motor 26 is also activated causing whipper blade 28 to rotate within whipping chamber 30. Whipping chamber 30 has been shown in cross-sectioned form to show whipper blade 28. The base powder emanating from the powder hopper dispenser outlet 18 falls into the mixing funnel 32 where it passes therethrough into whipping chamber 30. Both the base powder and the hot water entering into the mixing system, which is comprised of mixing funnel 32, whipping chamber 30 and, in the present embodiment, vacuum funnel 34, come into mixing contact therein to enable the hot water and the base powder to intermix thoroughly. The mixing funnel 32 and whipping chamber 30 may be constructed from a plastic material as, preferably, is the whipping blade of whipper 28. Thus, the dispensing of a hot beverage by depressing a button on keypad 80 will result in the simultaneous activation of dispensing valve 52, auger motor 16, whipper motor 26 and blower 38. The associated control lines extending to and from control board 20 and the electrical apparatus under its control are shown in FIG. 1 for clarity. Also controlled by control board 20 is the flavouring system, one flavour of which is shown by way of example in FIG. 1.

The apparatus of the flavouring system uses a liquid flavouring syrup contained within flavour containers, such as a flavour container 56. Flavour container 56 is in communication with a pump system 58 via supply line 60. When activated by control line 62, the liquid flavour syrup from the flavour container 56 is dosed into discharge line 64 where it is transported to be dispensed with the hot drink emanating from discharge nozzle 66 of the dispenser. As will be appreciated, the flavour discharge line 64 will be filled with the flavouring syrup when the dispenser 10 is set up and in use. Therefore, the quantity of flavouring syrup discharged by pump system 58 into one end of discharge line 64 will cause a corresponding amount of flavouring syrup to be discharged from the flavour discharge line 64 at the dispenser nozzle. In this way, the exact dosage or metering of the flavouring syrup into the drink dispensed is controlled. Flavour lines 64 pass through the frontal portion of dispenser 10 where they are supplied to the dispensing system of the dispenser.

In the arrangement of the flavour system shown in FIG. 1, the flavour pump system 58 and associated flavour syrup containers 56 are disposed below counter 68. As will be understood by those skilled in the art, other suitable locations for the flavour syrup containers 56 and pump system 58 remote from the dispenser 10 can be used as well. For example, on a wall 70 behind the dispenser 10 or within the interior of the door 24 of the dispenser 10. Another embodiment of a flavour dispensing system that is wall mounted will be explained in more detail with reference to FIG. 12.

Figure 2:
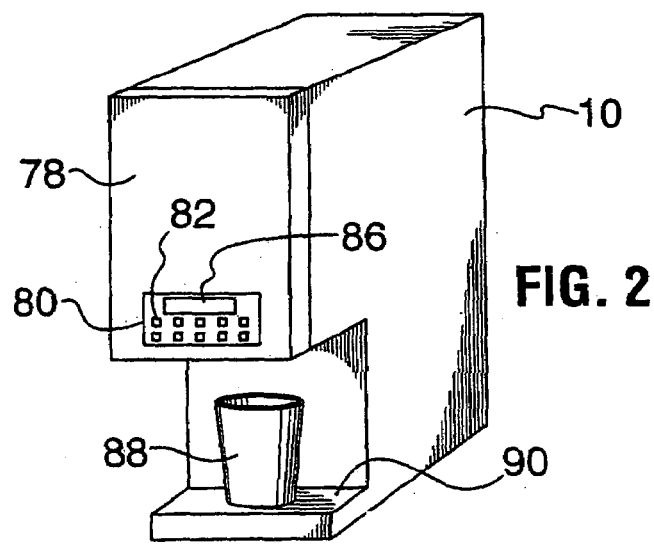
FIG. 2 is a perspective view of the dispenser of FIG. 1.

FIG. 2 shows a perspective view of a hot drink dispenser 10. The dispenser 10 has a front door 78, which is shown in the closed position in FIG. 2. Located on the front door 78 is a keypad 80 which includes a plurality of keys 82 which are user actuable to initiate dispensing of a hot drink from the dispenser 10. The selected drink is requested by depressing one of the keys 82 located within the keypad 80. The keypad 80 provides separate keys to enable the user to select the desired beverage. The keys 82 enable the user to select what size, for example, small, medium or large, and what flavour drink the user wishes to be dispensed. The keypad 80 is in communication with the main control board 20 by means of a control line 84 shown for example in FIG. 1. The keypad 80 can include a display 86 to provide information to the user like, for example, any messages that the control board 20 is programmed to display. The keypad 80 can also be used as a means to program the control board 20 by providing a keyed lock or setup key sequence. When the key sequence is depressed, the control board 20 is placed in programming mode, for example, to set drink parameters such as hot water amount, base powder amount, flavouring amount and so forth.

Based on the drink selection made by the user as indicated by depressing a selected key of keypad 80, the user selection is communicated to control board 20. Control board 20 then initiates a dispense sequence to control the operation of dispenser 10. The control sequence includes determining and dispensing the quantity of base powder to dispense for the selected beverage, the quantity of water that is required for the selection and the type and quantity of flavouring syrup required for the selection. The control can be effected by control board 20 based on a portion controlled basis. That is to say, when the user depresses a key 82 to make a selection, the control board 20 doses out the hot drink ingredients to produce a hot drink of the size and flavour selected by the user. Alternately, the keys 82 of keypad 80 can be adapted to dispense a drink on a push and hold basis. That is to say, the selected drink flavour will be dispensed for as long as the user depresses the selected key 82 of keypad 80. In either event, the drink is dispensed into a cup 88. In this specific embodiment, cup 88 rests on a drip tray 90 adapted to support the cup 88 and provide a catch basin for any overflow.

Figure 3:
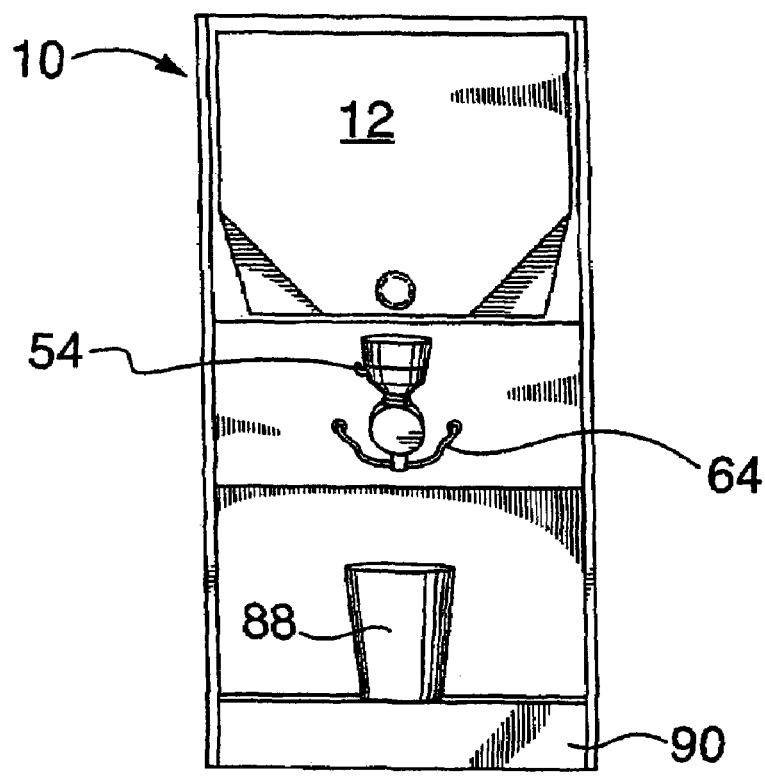
FIG. 3 is a front view of the dispenser of FIG. 1 without the front door.

FIG. 3 shows a front view of the drink dispenser of FIG. 1 with the front door removed for clarity. Hopper 12 extends to substantially occupy all of the upper interior space of the dispenser 10 allowing hopper 12 to hold as generous a supply of base powder as the dimensions of dispenser 10 permit. As there is only one large hopper 12 in the dispenser 10, the maximum amount of base powder practicable for a given dimensioned dispenser 10 is facilitated, consequently reducing the frequency of the need to refill powder into the dispenser 10. Also shown in the figure are flavour lines 64 that pass through the frontal portion of dispenser 10 where they are supplied to the dispensing system of the dispenser.

Figure 4:
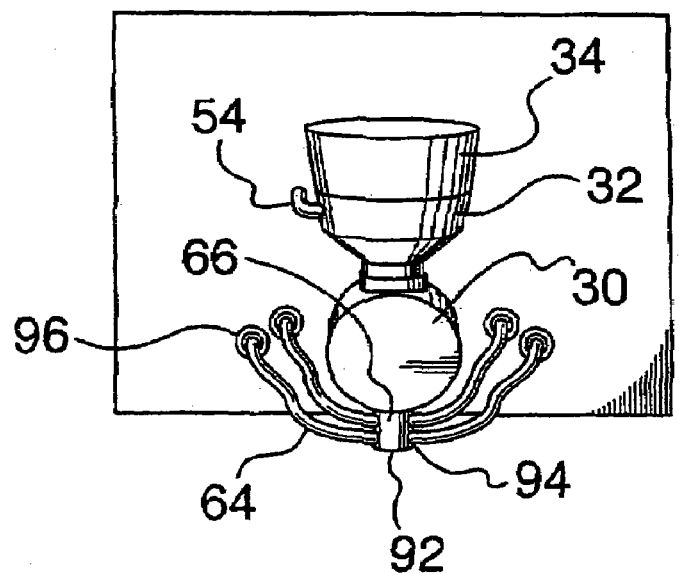
FIG. 4 is an enlarged view of the mixer apparatus of FIG. 3.

FIG. 4 shows a close up view of the dispenser in accordance with the preferred embodiment of the invention. The dispenser has a flavouring dispenser nozzle 92 which attaches to the dispenser nozzle exit 66 of the whipping chamber 30. Flavouring dispenser nozzle 92 has a plurality of flavour supply ports 94 extending from and in communication with the main discharge passage formed by the main body of the flavouring dispenser nozzle 92. The flavouring dispenser nozzle 92 is dimensioned to be slidingly, grippingly retained on exit dispensing nozzle 66 of the mixing chamber 30. The number of flavour supply ports 94 provided on flavouring dispenser nozzle 92 will be determined by the number of flavours which it is desired to be dispensed by the dispenser 10 to which it is fitted. Each flavour syrup arrives at the flavour dispensing nozzle 92 via its associated flavour discharge line 64 and each flavour discharge line 64 passes through the front portion of the dispenser as shown. For example, two flavour lines 64 are shown in FIG. 3 and four flavour lines 64 are shown in FIG. 4. Preferably, the pass through location of flavour line 64 includes a grommet 96 for protection of the flavour line 64. Hot water is supplied to the dispensing apparatus from the hot water dispenser line 54.

Figure 5:
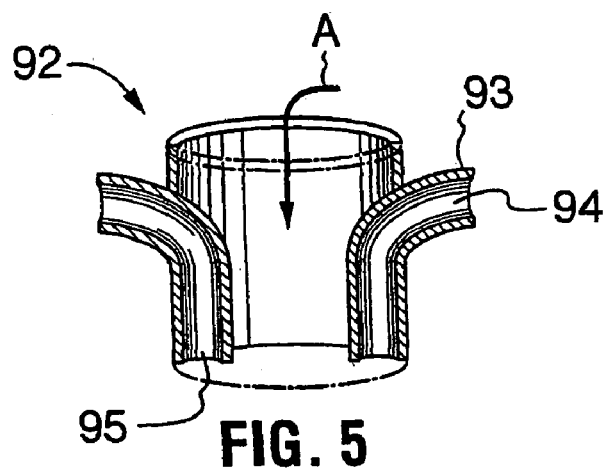
FIG. 5 is a cross-sectioned view of a flavouring dispenser nozzle in accordance with a specific example of implementation of the present invention.

FIG. 5 shows the flavouring dispenser nozzle 92 in cross-sectioned view for clarity of understanding its nature of construction. The flavouring dispenser nozzle 92 may be constructed from a plastic material. The stems forming flavour supply ports 94, on the flavour supply port inlet portion 93 extending from the dispenser nozzle 92, may be tubular and have an outside diameter dimensioned to frictionally engage the inner diameter surface of the flavour discharge lines 64 when coupled thereto. The outlet portion 95 of each flavour supply port 94 is proximal to the outlet of the passage, generally depicted by arrow "A" formed by the main body of the dispenser nozzle 92. The flavouring dispenser nozzle 92, or flavouring connector, provides a number of flavour supply ports 94 which stem from the location where the flavouring is supplied to the hot drink before it is dispensed from the dispenser. Thus the flavouring connector port configuration is adapted to present a point of entry for the flavour which will not permit cross-contamination of one flavour with another. The flavouring connector can be with a varied number of stems 93 and corresponding supply ports 94 to enable any practical number of flavour ports to be provided to add the flexibility of providing for additional flavours.

Figure 6:
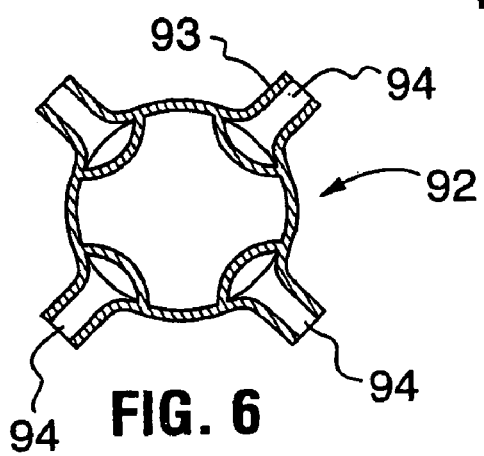
FIG. 6 is a top view of the flavouring dispenser nozzle of FIG. 5.
Figure 7:
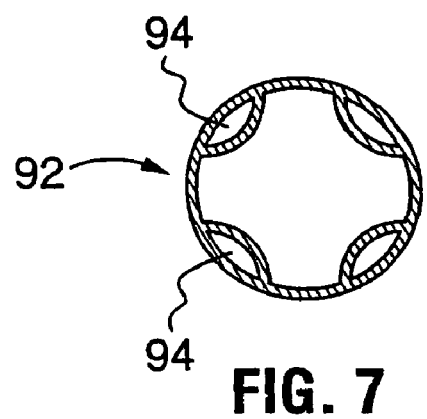
FIG. 7 is a bottom view of the flavouring dispenser nozzle of FIG. 5.

FIGS. 6 and 7 show a top and bottom view respectively of the flavour connector 92 of FIG. 5.

While the depiction of the embodiment of the flavour connector 92 shown in FIGS. 5, 6 and 7 show the flavour supply ports 94 extending into the interior volume of the passage "A", it will be understood that the body of the connector 92 forming passage "A" may be constructed to provide a smooth circular interior surface shape with the stems 93 extending along the exterior of the connector 92.

Figure 8:
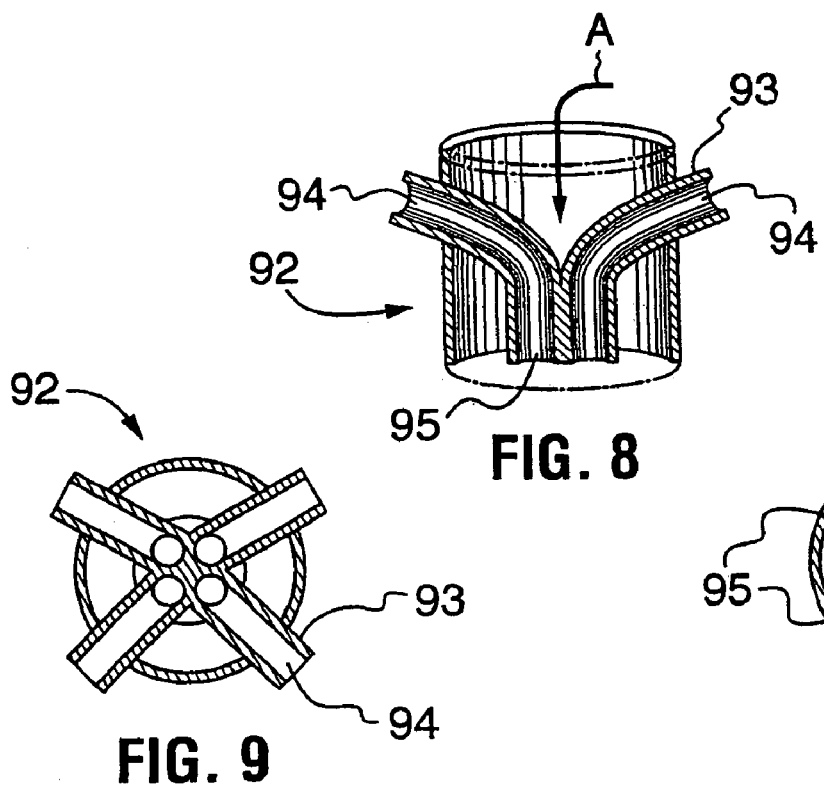
FIG. 8 is a cross-sectioned view of an alternate embodiment of a flavouring dispenser nozzle.

FIG. 8 is an alternate embodiment of the flavour connector 92 of FIG. 5. In this embodiment, stems 93 forming flavour supply ports 94 a positioned proximal to each other in the central region of passage "A" of the flavour connector 92. In this embodiment, as with the embodiment of FIGS. 5, 6 and 7, the discharge or outlet 95 of each flavour supply port 94 is proximal to the exit or discharge of the passage "A" formed by the connector 92 to prevent contamination or cross-mixing of the flavouring syrups from one dispense cycle to the next.

Figure 9:
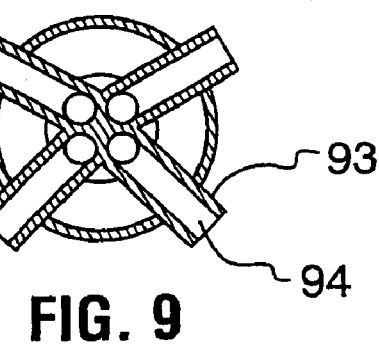
FIG. 9 is a top view of the flavouring dispenser nozzle of FIG. 8.
Figure 10:
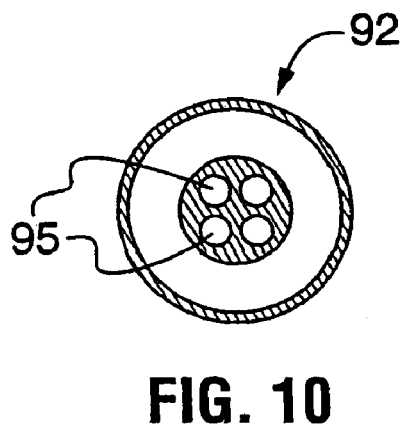
FIG. 10 is a bottom view of the flavouring dispenser nozzle of FIG. 8.

FIGS. 9 and 10 show a top and bottom view respectively of the flavour connector 92 of FIG. 8.

As will be understood, it is possible to permit a combination of flavours to be supplied to the hot drink to be dispensed. That is, multiple flavours can be mixed into one beverage. For example, should a customer want a French vanilla and Irish cream cappuccino mix, the dispenser apparatus can proportionately add mixes of each of the flavours into the hot drink dispensed to satisfy the customer request.

The apparatus and control of the present invention permit an operator to purchase a base unit that can include a number of flavours, for example, four flavours. Additional flavours may be added to the system without requiring additional counter space by simply attaching a flavouring dispenser nozzle 92 that is provided with the number of flavour supply ports 94 to accommodate the additional flavours desired. Each flavour will require appropriate supply apparatus including a flavour discharge line 64, a pump 58, a supply line 60 and the flavour syrup itself in a flavour container 56.

Figure 11:
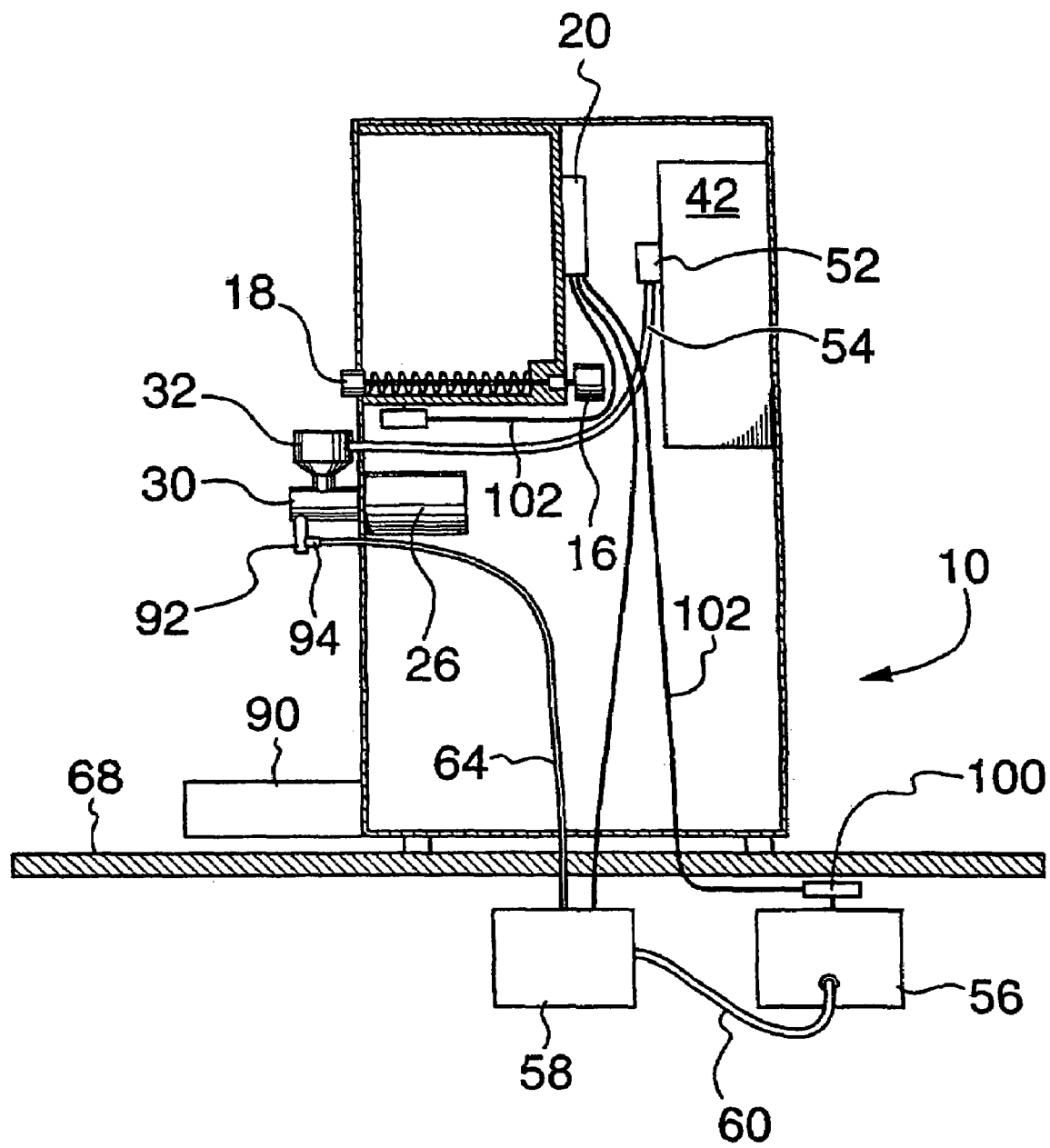
FIG. 11 is a side view in partial cross section of an alternate embodiment of a multi-flavoured hot drink dispenser.

FIG. 11 shows an alternate embodiment of the dispenser 10 which does not have a powder vacuum discharge system. The other elements of the system remain the same. In this embodiment, the flavouring system also includes a pumping system 58 for each flavour syrup 56 that is to be dispensed by the dispenser 10. When a selection button on the keypad 80 is depressed, the selected flavour for the hot drink to be dispensed is provided to the dispenser 10 by means of the pump system 58. A plurality of pumps 58 is provided corresponding to the selected plurality of flavouring syrups 56 to be available as flavours for dispenser 10.

Figure 12:
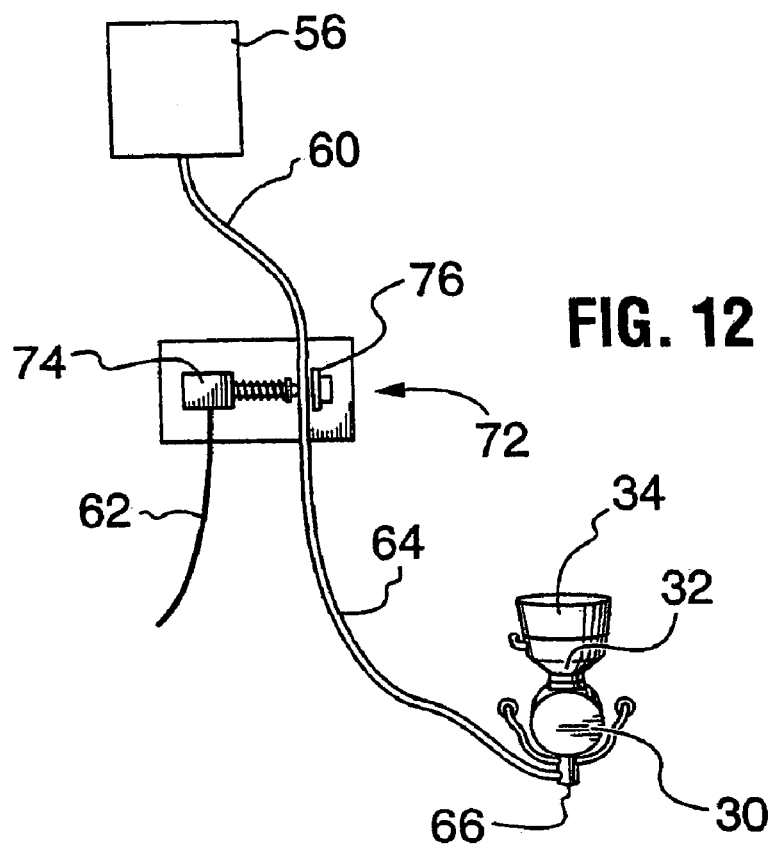
FIG. 12 is a perspective view of a second embodiment of a flavour supply system for use with a multi-flavoured hot drink dispenser.
Figure 12A:
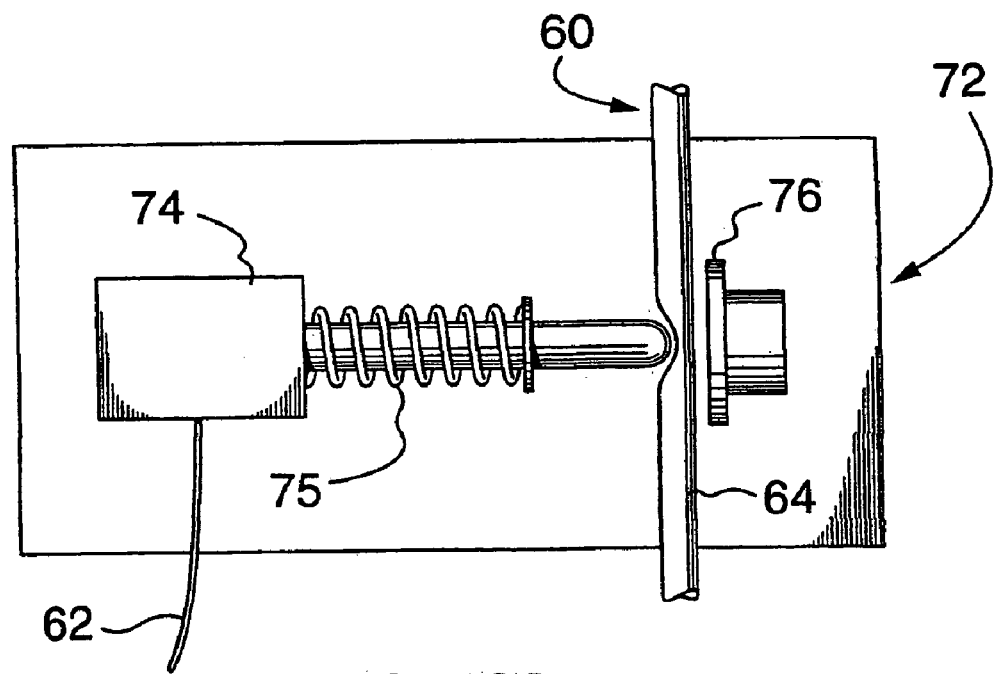
FIG. 12A is an elevation view of the flavour supply system of FIG. 12.

FIG. 12 shows an alternate embodiment of the apparatus to deliver the flavour syrups to the dispenser. The arrangement of FIG. 12 provides an elevated location for the flavour syrup containers 56, only one of which is shown in the figure, to provide sufficient head or distance between the flavour container 56 and the mixing apparatus 28, 32, 34, and 66 to permit gravity feed of the flavouring syrup. The flavour supply line 60 leads to an aseptic control valve 72. Control valve 72 meters the flavouring fluid supplied to the flavour discharge line 64 thereby to control the quantity of flavouring syrup delivered to the dispensing apparatus. In this embodiment of the flavour delivering system, each syrup flavour tube, only one of which 60 is shown in figure, runs through its own independent aseptic valve 72 or pinching mechanism. The valve mechanism 72 can include a normally closed valve, for example, a spring-loaded push-pull solenoid actuated rod 74 and backstop 76 which is shown in enlarged view in FIG. 12A. The pinch mechanism 72 is used to stop the flow of flavouring syrup to the dispenser apparatus. When the pinch mechanism 72 is at rest, all of the spring load of the solenoid actuated rod 74 is applied to the tubing to close it off from fluid communication between supply line 60 and flavour discharge line 64. Thus, compression spring 75 forces the rod 74 against the backstop 76 to pinch the tube shut. When the dispenser apparatus is activated in response to the selection made by the user, the solenoid actuated rod 74 will be activated by the control board 20 (of FIG. 1) via control line 62 for a predetermined period of time to allow a metered dose amount of flavouring syrup from the flavour container 56 to enter into flavour discharge line 64. As the flavour syrup enters the discharge line 64, it will be drawn by gravity into and toward mixing apparatus 66 to supply a metered dose of flavouring syrup to the drink being dispensed.

The apparatus of the present invention can also include sensors to monitor the hot drink ingredient supplies. The sensors work in conjunction with the main control board 20.

Thus, the apparatus of the invention serves the needs of the service operators by including apparatus designed to inform a user when the dispenser apparatus is out of any product. The dispenser 10 preferably includes sensors to produce activation enable and activation disable signaling which is used to enable and to prevent the commencement of a product dispense cycle. When activation disable signaling is produced, there is insufficient drink ingredients to produce the selected drink.

In the embodiment of FIG. 1, for the sensor apparatus provided for the base powder, the base powder hopper 12 rests on a weight sensor 104 which is set to a threshold amount to sense when the base powder product has run low. When the low level has been reached, a disable condition is signaled via sensor line 162 to the main control board 20 which causes the main control board 20 to deactivate a dispense cycle for all of the selection keys 82 on key pad 80. All keys 82 are deactivated since the base powder is used to make all of the beverages that can be selected from the selection keypad 80. When the weight of the base powder hopper 12 falls below the pre-set threshold, the sensor signaling on line 102 may also cause the main control board 20 to produce a message on the keyboard display 86 to announce to the user that product is not available. On the other hand, when the base powder hopper rests weight sensor 104 with a sufficient weight to exceed the threshold amount, the weight sensor 104 will produce an activation enable signal that causes the main control board to activate a dispense cycle for all of the selection keys 82 on key pad 80.

Also, each individual flavouring syrup container 56 is equipped with a sensor mechanism to sense when the flavouring syrup pouch or container is empty. In the embodiment of FIG. 1, each pouch or container 56 is suspended from a weight sensor 100, which measures the weight of the flavouring syrup container 56. In the embodiment relying on a weight sensor, when the weight of the flavour container 56 falls below a pre-set threshold, main control board 20 is signaled via sensor line 102 with an activation disable signal. The activation disable sensor signaling on line 102 causes the main control board 20 to produce a message on the keypad display 86 to announce to the user that the selected product is not available. The activation disable sensor signaling on line 102 also causes main control board 20 to de-activate and ignore the corresponding drink selection switch or key 82 depressed by the user on the keypad 80. Therefore, if a selected flavour syrup is empty, the corresponding beverage cannot be dispensed. On the other hand, when the weight of the flavour container 56 is above the pre-set threshold, main control board 20 is signaled via sensor line 102 with an activation enable signal thereby permitting the unimpeded dispensing operation of the dispenser 10. Alternatively, in the embodiment of FIGS. 15–19, the flavour supply lines include a vacuum switch 126 which measures the pressure in the supply line extending between the flavour pouch 122 and pump 128. When the flavour pouch 122 is empty, operation of pump 128 will induce a vacuum in the supply line and the main control board 20 will be signaled with a flavour empty signal.

Figure 13:
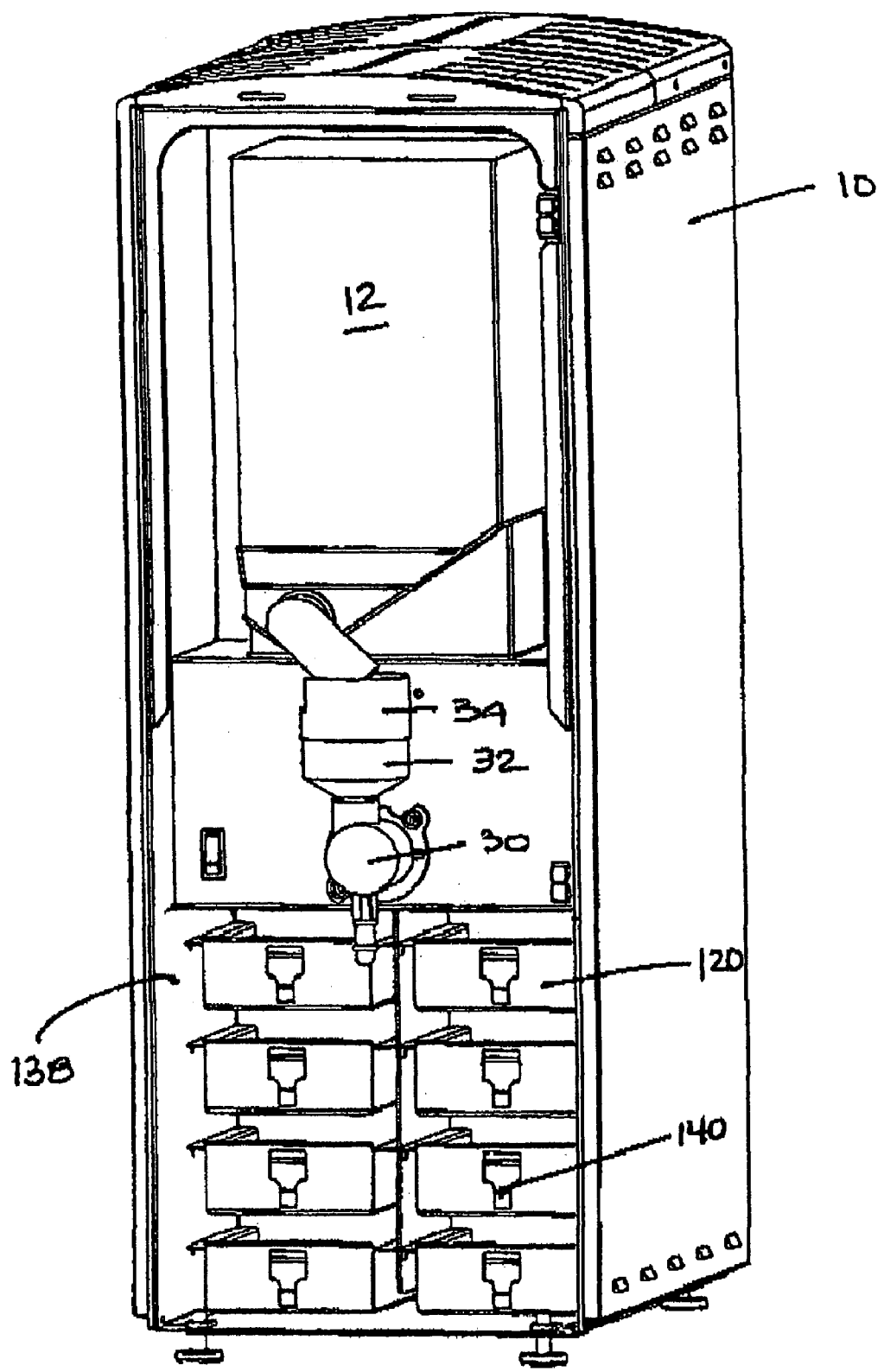
FIG. 13 is a perspective view of an alternate embodiment of the dispenser shown without a front door and providing an integrated additive liquid flavour supply.
Figure 14:
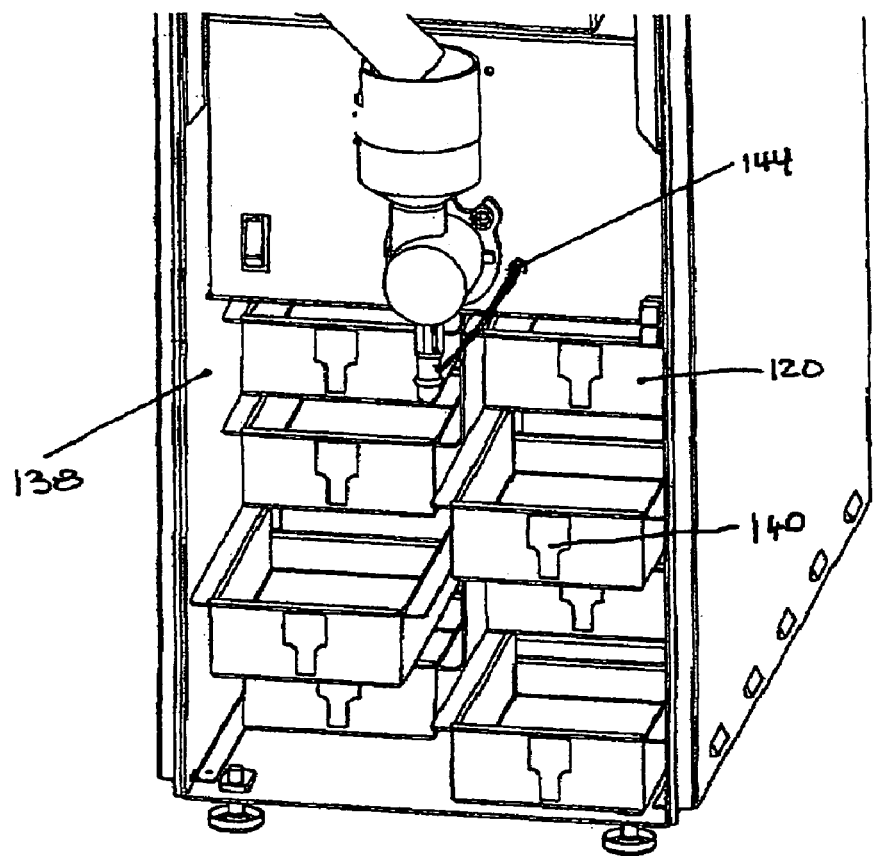
FIG. 14 is an enlarged view of the additive liquid flavour cradle portion of FIG. 13 in which the liquid additive pouches are placed.

Referring to FIGS. 13 and 14, hot beverage dispenser 10 is shown with an open front door 14. Upon opening the front door 14 the user has access to the base powder hopper 12, which can be removed, refilled and cleaned. Also evident is, the hot beverage mixing system which comprises the vacuum funnel 34, the mixing funnel 32 where the hot water is introduced to the powdered beverage, and the whipping funnel 30 where the powder and water are whipped together.

The user also gains access to the liquid additive compartment 138. Housed within the liquid additive compartment 138 are multiple (from 1 to 8 or more) additive pouch cradles 120. The cradles 120 are designed so that they can easily slide in and out of the flavor compartment 138. This facilitates the loading of full liquid additive pouches 122 and the discharging of empty liquid additive pouches 122.

Figure 18:
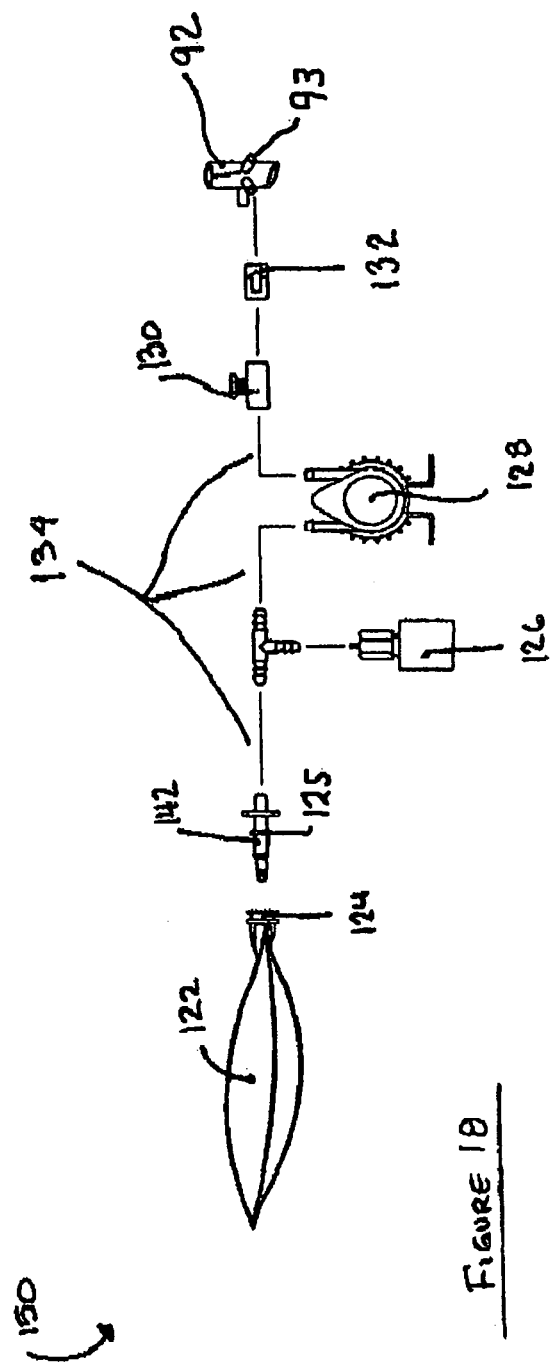
FIG. 18 is a schematic view of an additive line with a first variant.

For the purpose of this embodiment, we are referring to a source of liquid additive as a flexible pouch 122, which can vary in size and volume. As can be seen in FIG. 18, connected to the flexible pouch 122 on one end is a female fitment 124 with guide ridges 125 on each side. The pouch and fitment system facilitate the loading and unloading of pouches because a reusable male fitment 142 connected to the inlet end of the liquid additive tube 134 can easily be inserted and extracted from the female fitment 124 on the flexible pouch 122. To facilitate the exchanging of pouches 122, each of the cradles 120 has been designed with an entry slot 140 which is dimensioned to firmly engage the ridges 125 on the female fitment 124 of the pouch cradle 120. This prevents the fitment 124 from moving in and out of the cradle so that the male fitting 142 can be easily inserted. It is understood that alternate sources of liquid additives can be implemented other than a flexible pouch such as described.

In operation the user depresses one or more of the switches 82 on door 14 corresponding to the selected flavour drink and the control board 20 regulates the on/off time of the solenoid valve 52, which opens and allows hot water to flow through the hot water supply line 54. The control board 20 also regulates when the liquid additive system 150 will be activated, what part will be activated, for how long and in what sequence.

Figure 16:
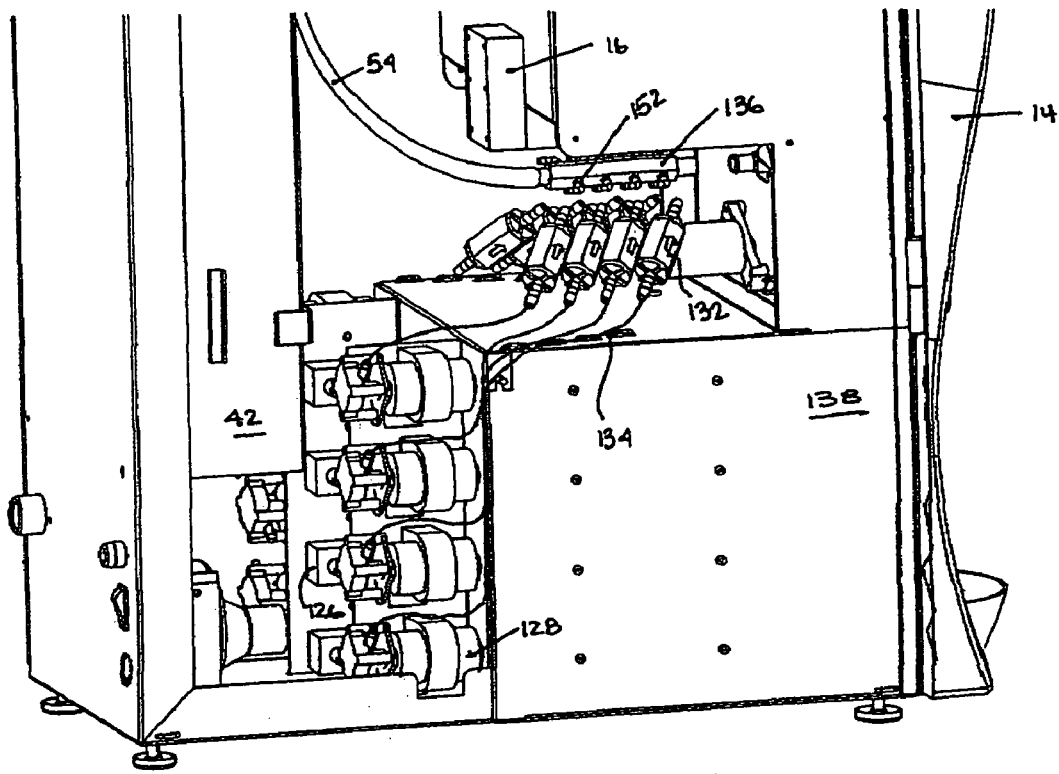
FIG. 16 is a close up side view of a second variant of the liquid additive system, depicting multiple liquid additive controls and lines coupled to an inline manifold of the hot water supply.

FIG. 16 depicts an enlarged view of the hot water supply line 54, the auger motor 16 which drives powder out of the powder hopper/container 12 (not in view). Also in view are the hot water boiler 42 and a side view of the liquid additive compartment 138. Also in view is the liquid additive system 150 which is made up of a plurality of pumps 128, vacuum switches 126 and check valves 132. One pump, vacuum switch and check valve is provided for each corresponding flavour cradle 120 of the liquid additive compartment 138 to supply the selected liquid additive to manifold 136. For clarity, the tubes connecting valves 132 to manifold 136 have been omitted in this figure.

Referring to FIGS. 17 to 20, details of the liquid additive system are shown for each of the corresponding flavour cradles 120. For each flavour, the liquid additive system 150 comprises a pump 128 in fluid communication with a source of liquid additive 122 by means of an additive outlet/female fitment 124. The male fitting 142 is connected to the inlet of the additive line 134. A vacuum switch 126 is mounted perpendicularly to the additive line 134 between the source of liquid additive 122 and a pumping means 128. The vacuum switch 126 is used to sense when the additive pouch 122 is empty, in which case the vacuum switch 126 activates a signal that is sent back to the main control board 20 which returns a signal to stop operation of the respective pump 36 attached to the empty additive pouch 122. A signal is also sent to the user via the control board 20 and a flashing light or message is produced on a display screen 17, informing the operator that the pouch 122 is empty. It is important to note that the vacuum switch 126 represents one means of detecting if the pouch 122 is empty and relaying that fact to the user and that other means to achieve this are plausible. Installed inline with the additive line 134 are an adjustable valve 130 which can be used to regulate flow and a check valve 132 which maintains the system air tight.

Figure 19:
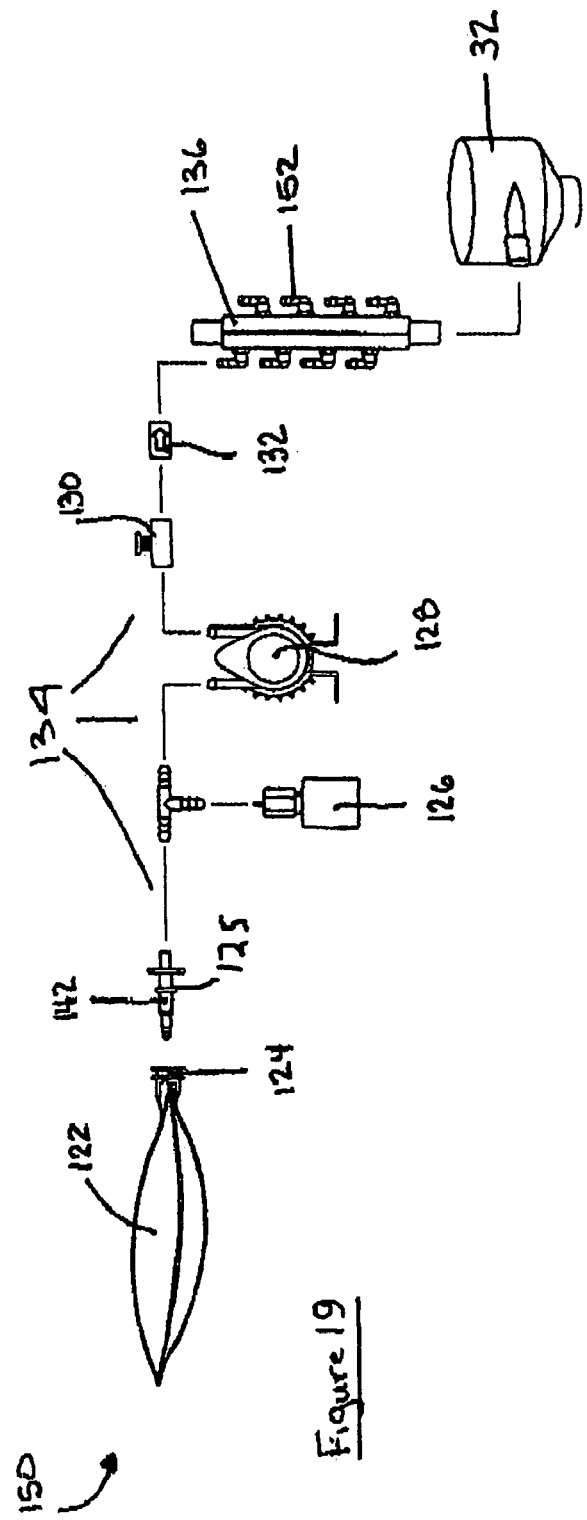
FIG. 19 is a schematic view of an additive line with a second variant.

Referring to FIGS. 18 and 19, continuing past the check valve 132, the additive line 134 can be constructed according to two different variants.

Figure 15:
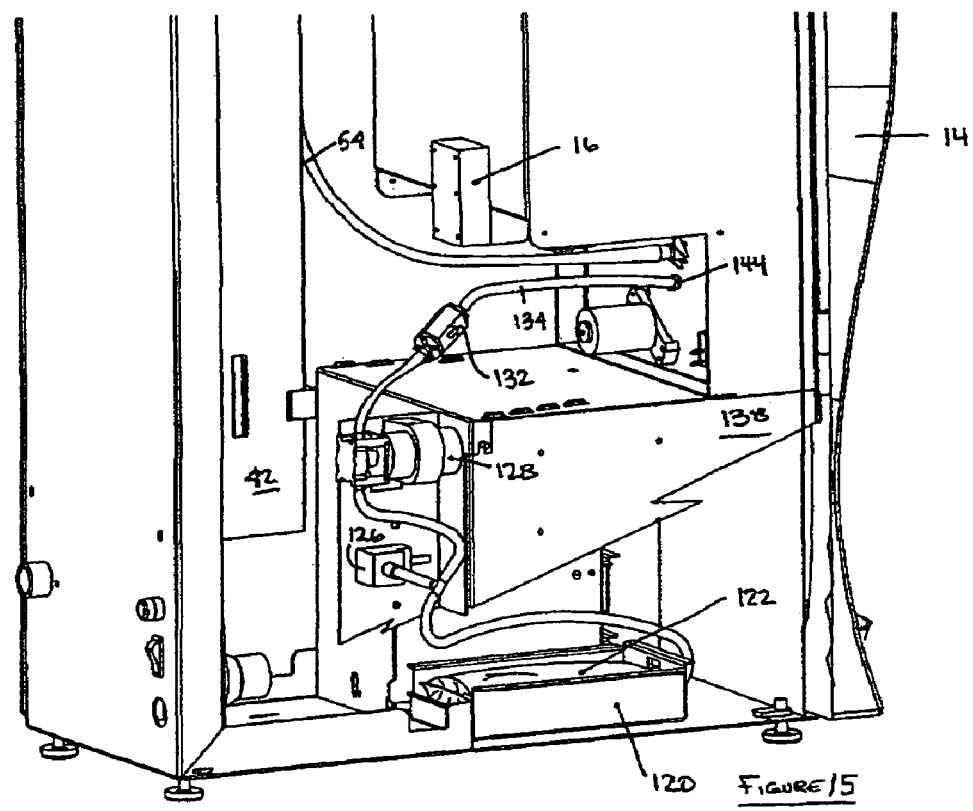
FIG. 15 is an enlarged perspective view of the liquid additive system in accordance with a first variant, one control has been included for simplicity, the side wall of the liquid additive chamber has been removed in order to view the liquid additive source of supply and supply pouch cradle

A perspective view of a first variant is depicted in FIG. 15, and the schematic view is depicted in FIG. 18. From the check valve 132, the liquid additive line 134 continues through the machines chassis at 144 and is connected to the dispense tip 92, shown in FIG. 18. As is evident in FIG. 15, only the components required for one liquid additive have been shown for simplicity. A portion of the additive compartment 138 side wall has been removed in order to view the cradle 120 housing the additive pouch 122. Normally, the additive system will be made up of multiple additive pouches 122, cradles 120, additive lines 134, pumps 128, check valves 132, etc. The multiple additive lines 134 will be connected to an equal number of inlet ports 93 on the dispense tip 92 as shown in FIGS. 5 through 10 and FIG. 18. Therefore, each liquid flavour additive is injected into one main base beverage stream. Due to the nature of the design, the scenario depicted in this variant prevents any cross contamination of liquid additives.

In operation, the first variant functions as follows. The user depresses the appropriate switch(es) 82 on the keypad 80 on the front door of the apparatus, selecting the beverage type they desire. The control board 20 activates the solenoid valve 52, which expels water from the hot water boiler 42 through the hot water supply line 54. The control board 20 also activates the auger motor 16, which expels powder from the hopper 12 into the mixing system 34, 32, 30. The water and powder is expelled at a pre-determined rate pre-programmed into the control board 20. The water and powder could be expelled for a predetermined amount of time other wise known as PORTION CONTROL, but not necessarily. The alternative is known as FREE FLOW or PUSH AND HOLD, which means that as long as the button is depressed, water and powder are being expelled. (These represent functions involved in the production of the base hot beverage). Under a PORTION CONTROL set up, based on the push button 82 depressed, the respective liquid additive system is activated by the control board 20. The liquid additive from the pouch 122 is injected into the stream of mixed hot powder beverage via the dispense tip 92. It is injected at a predetermined time during the base hot beverage production cycle, in order to increase the mixing and eliminate the possibility of cross contamination. In the instance when PUSH AND HOLD is implemented, the liquid additive is pulsed into the base hot beverage stream at dispenser tip 92 in order to attain the proper mix. For example, at a minimum an 8 oz beverage is produced, we can further reduce the beverage production down to one finished ounce of hot beverage which consists of powder, water and liquid additive. Since the base beverage flow rate is predetermined we can inject the required additive for one ounce of finished product. Therefore, if the flow rate is 1 oz/second for every second that the user depresses the button, the system will inject a proportional number of millilitres of liquid additive into the stream of hot water. Due to the fact that the ratio of hot water to liquid additive is very (high approximately 58-1), the time to inject the additive will be in milliseconds. Since the apparatus provides one main base hot beverage line and a plurality of liquid additives, this scenario permits to eliminate cross contamination of liquid additives.

Figure 17:
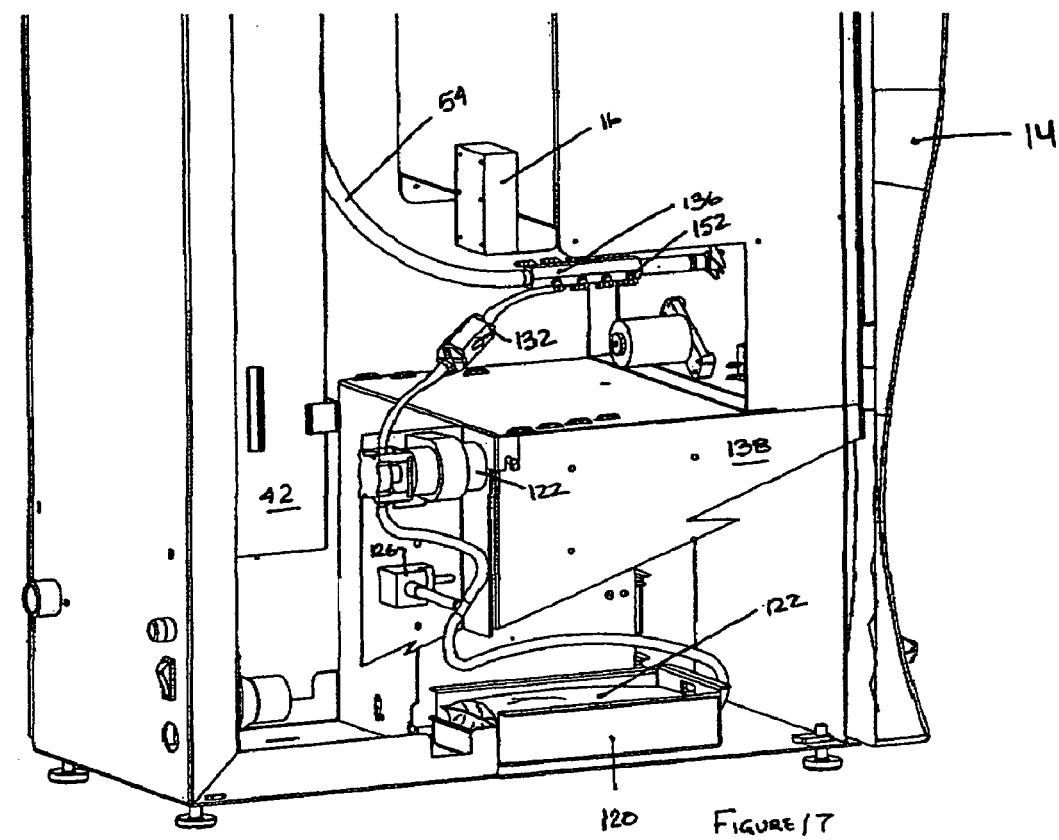
FIG. 17 is an enlarged perspective view of the liquid additive system in accordance with the second variant of FIG. 16, one control has been included for simplicity, the side wall of the liquid additive chamber has been removed in order to view the liquid additive source of supply and supply pouch cradle.

A perspective view of a second variant is depicted in FIG. 16, and the schematic view is depicted in FIG. 19. From the check valve 132, the liquid additive line 134 outlet is connected to an additive manifold 136 through which manifold the hot water supply passes. The manifold is designed with multiple inlet ports 152 equal to the number of liquid additive lines 134. The manifold 136 is installed inline with the hot water supply line 54 as shown in FIGS. 16 and 17. Each of the inlet ports 152 is in communication with the water supply line 54.

In operation the second variant functions as follows. The user depresses the appropriate switch(es) 82 on the keypad 80 on the front door of the apparatus, selecting the beverage type they desire. The control board 20 activates the solenoid valve 52 which expels water from the hot water boiler 42 through the hot water supply line 54. The control board 20 also activates the auger motor 16 which expels powder from the hopper 12 into the mixing system 34, 32, 30. The water and powder is expelled at a pre-determined rate pre-programmed into the control board 20. As in the first variant, the water and powder could be expelled for a predetermined amount of time other wise known as PORTION CONTROL, but not necessarily. Alternatively, FREE FLOW or PUSH AND HOLD could also be implemented in the second variant. In the case of variant two under a PORTION CONTROL set up, based on the push button 82 depressed, the respective liquid additive system is activated by the control board 20. The liquid additive from the pouch 122 is injected through the liquid additive manifold 136 into the stream of hot water flowing through the hot water supply line 54. In the instance when PUSH AND HOLD is implemented, the liquid additive can be pulsed into the hot water stream at additive manifold 136 in order to attain the proper mix.

Now that the invention has been described, numerous modifications, substitutions and equivalents will become apparent to those skilled in the art. The scope of the invention is not to be limited by the embodiments disclosed herein but is defined by the claims appended hereto.

The invention claimed is:

1. An apparatus for dispensing a flavored beverage, comprising:
    a) a hopper adapted to hold a common base powder and having a hopper outlet, the hopper being operative to dispense the base powder via the hopper outlet in accordance with a powder dispense signal;
    b) a water dispenser having a water outlet, the water dispenser being operative to dispense water via the water outlet in accordance with a water dispense signal;
    c) a flavor dispensing unit adapted to store a plurality of supplies of flavoring syrups, the flavor dispensing unit being operative to dispense via at least one flavor dispensing outlet at least one of the flavoring syrups in accordance with a respective one of a plurality of flavor dispense signals;
    d) a mixing unit adapted to receive and admix base powder from the hopper outlet, water from the water outlet, and the at least one of the flavoring syrups from the at least one flavor dispensing outlet to produce the flavored beverage; and
    e) a control unit operative to produce the powder dispense signal, the water dispense signal, end the plurality of flavor dispense signals in response to user actuation indicative of a selected beverage flavor and a desired beverage volume, the control unit being further operative to generate the water dispense signal in accordance with the desired beverage volume, to generate the powder dispense signal in accordance with at least the desired beverage volume, and to generate the at least one flavor dispense signal in accordance with both the desired beverage volume and the selected beverage flavor.

2. An apparatus as defined in claim 1, further comprising a push button, wherein user actuation comprises depression of the push button and wherein the desired beverage volume is related to a duration of time during which the push button is depressed.

3. An apparatus as defined in claim 1, further comprising a keypad, wherein user actuation comprises selection of the desired beverage volume and selected beverage flavor from the keypad.

4. An apparatus as defined in claim 1, wherein the hopper comprises a motor driven auger dispenser along a bottom portion thereof, the auger dispenser being responsive to the powder dispense signal to dispense a controllable amount of the base powder via the hopper outlet.

5. An apparatus as defined in claim 1, wherein the flavor dispensing unit comprises, for each supply of flavoring syrup, a pinch mechanism operable between an open position to dispense the flavoring syrup and a closed position to prevent the dispensing of the flavoring syrup, the pinch mechanism being biased into the closed position and being responsive to the respective one of the flavor dispense signals to achieve the open position.

6. An apparatus as defined in claim 5, wherein the pinch mechanism comprises a solenoid actuated push-pull rod and a spacedly disposed backstop.

7. An apparatus as defined in claim 5, wherein the pinch mechanism comprises a coil spring adapted to bias the pinch mechanism into the closed position.

8. An apparatus as defined in claim 1, wherein the flavor dispensing unit comprises, for each supply of flavoring syrup, a pump operable between an on state in which the flavoring syrup is dispensed and an off state in which the flavoring syrup is prevented from being dispensed, the pump being normally in the off state and being, responsive to the respective one of the flavor dispense signals to toggle into the on state.

9. An apparatus as defined in claim 1, further comprising:
   a) a vacuum system comprising a vacuum funnel interposed between the hopper outlet and the mixing unit, and a discharge outlet disposed remotely from the hopper outlet; and
   b) a blower operative to draw air from the vacuum funnel and expel the drawn air from the discharge outlet, whereby base powder particles dispersed into the air proximal to the vacuum funnel are extracted and expelled through the discharge outlet.

10. An apparatus as defined in claim 1, further comprising a boiler in fluid communication with the water dispenser, the boiler comprising a water inlet to receive water from a water supply and a heating element to apply controlled heating to water contained in the boiler.

11. An apparatus as defined in claim 1, wherein the hopper, the water dispenser, the mixing unit, and the control unit are located within a housing of the apparatus and wherein at least part of the flavor dispensing unit is located outside of the housing of the apparatus.

12. An apparatus as defined in claim 11, wherein the flavor dispensing unit comprises a plurality of containers, each container being adapted to store a respective one of the plurality of supplies of flavoring syrups and being located outside of the housing of the apparatus.

13. An apparatus as defined in claim 1, wherein the hopper, the water dispenser, the flavor dispensing unit, the mixing unit, and the control unit are located within a housing of the apparatus.

14. An apparatus as defined in claim 1, wherein the control unit is operative to generate the powder dispense signal in accordance with both the desired beverage volume and the selected beverage flavor.

15. A method of producing a flavored beverage, comprising:
   a) receiving user actuation indicative of a selected beverage flavor and a desired beverage volume,
   b) using a dispenser apparatus to produce the flavored beverage by performing the steps of:
      i) supplying water in an amount dependent on the desired beverage volume;
      ii) supplying a base powder in an amount dependent on at least the desired beverage volume;
      iii) supplying at least one flavoring syrup from at least one of a plurality of flavoring syrup supplies in an amount dependent on the desired beverage volume and in a distribution corresponding to the selected beverage flavor; and
      iv) admixing the base powder, the water, and the at least one flavoring syrup to produce the flavored beverage.

16. A method as defined in claim 15, wherein user actuation comprises user manipulation of at least one of a plurality of keys on a keypad.

17. A method as defined in claim 15, wherein user actuation comprises user manipulation of a push button and wherein production of the flavored beverage is continued as long as the push button is being held depressed.

18. A method as defined in claim 15, wherein step ii) comprises supplying the base powder in an amount dependent on both the desired beverage volume and the selected beverage flavor.

* * * * *

UNITED STATES PATENT AND TRADEMARK OFFICE
CERTIFICATE OF CORRECTION

PATENT NO. : 7,044,336 B2 Page 1 of 1
APPLICATION NO. : 11/047639
DATED : May 16, 2006
INVENTOR(S) : Claudio Bertone It is certified that error appears in the above-identified patent and that said Letters Patent is hereby corrected as shown below:

Column 12: - Claim 1, element e), line 2, "end the plurality" should read "and the plurality"; and
Column 13: - Claim 8, line 6, "being, responsive to" should read "being responsive to".

Signed and Sealed this

Twenty-second Day of August, 2006

JON W. DUDAS
*Director of the United States Patent and Trademark Office*